(12) United States Patent
Chandolu et al.

(10) Patent No.: US 8,819,231 B2
(45) Date of Patent: Aug. 26, 2014

(54) DOMAIN BASED MANAGEMENT OF PARTITIONS AND RESOURCE GROUPS

(75) Inventors: Uma M. Chandolu, Bangalore (IN); Vidya Ranganathan, Bangalore (IN); Lakshmanan Velusamy, Vedichipalayam (IN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 13/324,376

(22) Filed: Dec. 13, 2011

(65) Prior Publication Data

US 2013/0151704 A1 Jun. 13, 2013

(51) Int. Cl.
*G06F 15/173* (2006.01)
(52) U.S. Cl.
USPC ............................................ 709/225; 709/226
(58) Field of Classification Search
None
See application file for complete search history.

(56) References Cited

U.S. PATENT DOCUMENTS

| | | | | |
|---|---|---|---|---|
| 6,023,765 | A * | 2/2000 | Kuhn | 726/4 |
| 6,085,191 | A * | 7/2000 | Fisher et al. | 707/737 |
| 7,693,838 | B2 | 4/2010 | Morgan et al. | |
| 7,814,561 | B2 | 10/2010 | Fried et al. | |
| 7,895,409 | B2 | 2/2011 | Mendonca | |
| 8,136,143 | B2 * | 3/2012 | Hannel et al. | 726/1 |
| 8,429,191 | B2 * | 4/2013 | Desai et al. | 707/783 |
| 8,595,821 | B2 * | 11/2013 | Desai et al. | 726/13 |
| 2007/0214497 | A1 * | 9/2007 | Montgomery et al. | 726/4 |
| 2008/0320590 | A1 | 12/2008 | Craft et al. | |
| 2010/0058197 | A1 | 3/2010 | Chee et al. | |

OTHER PUBLICATIONS

Gough et al.; AIX V6 Advanced Security Features—Introduction and Configuration; IBM Redbook; Sep. 2007; Chapter 3; pp. 165-250.
Bassemir et al.; IBM AIX Version 7.1 Differences Guide; IBM Redbook; Dec. 2010; Chapter 8; pp. 289-362.
Koikara et al.; Privileges Granted as Needed; website article (www.ibmsystemsmag.com/aix/administrator/systemsmanagement/Privileges-Granted-as-Needed); Jan. 2010.
Jeyapaul et al.; Understanding advanced AIX features: Role-based access control in simple steps; Jun. 23, 2009; pp. 1-11.
Desai et al.; Domain Based Isolation of Objects; U.S. Appl. No. 13/006,621, filed Jan. 14, 2011.
Hu et al.; Assessment of Access Control Systems; National Institute of Standards Technology; Sep. 2006; pp. 1-60.
Cisco; Cisco Application Networking Manager Version 1.1; Data Sheet; 2006; pp. 1-8.
Hewlett-Packard Development Company, L.P.; HP-UX 11i v3: A Mission-Critical UNIX Alternative to Oracle Solaris; White Paper; Mar. 2011; pp. 1-27.
Ideas International; HP-UX 11i v3 Delivers Superior Capabilities for Virtualized Data Centers; White Paper; Mar. 2008; pp. 1-37.

(Continued)

*Primary Examiner* — John B. Walsh
(74) *Attorney, Agent, or Firm* — James L. Baudino (57) ABSTRACT

According to one aspect of the present disclosure, a method and technique for domain based partition and resource group management is disclosed. The method includes: responsive to determining that an operation is being attempted on an object, determining a partition identifier associated with the object; determining a domain identifier associated with a user attempting the operation; determining whether the operation can proceed on the partition based on domain isolation rules, the domain isolation rules indicating rules for allowing or disallowing operations to proceed on the partition based on partition identifiers and domain identifiers; and responsive to determining that the operation on the partition can proceed based on the domain isolation rules, permitting the operation.

22 Claims, 5 Drawing Sheets

(56) References Cited

OTHER PUBLICATIONS

Hewlett-Packard; HP AlphaServer SC System Software, Version 2.5; Software Product Description Paper; Sep. 2002; pp. 1-11.

Chellappan et al.; Domain Based User Mapping of Objects; U.S. Appl. No. 13/212,024, filed Aug. 17, 2011.

Nielsen; Power7; Product Description paper; Sep. 2010; pp. 1-26.

* cited by examiner

DOMAIN BASED MANAGEMENT OF PARTITIONS AND RESOURCE GROUPS

BACKGROUND

In some operating systems, such as a UNIX or UNIX-like operating system, access control mechanisms may be used to control access to certain objects (e.g., files, reports, databases and/or system resources). For example, in a UNIX or UNIX-like operating system, system administration activities are typically performed through a root user account. Authentication methods may be used to authenticate an identity of a user desiring to access system resources. The authentication method may include verifying a username, password and/or biometric entry. The authorization may also include verifying group and/or security level checks. Authorization to access system resources may also be controlled on a more granular level, such as controlling access to certain objects or resource entities. For example, system administrators responsible for the administration of the system share and/or manage the password to the root account or use access control tools which allow access to the desired services/objects after authentication has been provided. One additional level of access control granularity may be provided utilizing domains to further restrict management of a specific resource. Domains are a mechanism of associating tags to resources that allow or disallow users with those tags attached to them to access the resource for a particular action based on a set of governing rules.

BRIEF SUMMARY

According to one aspect of the present disclosure a method and technique for domain based management of software or logical partitions and resource groups is disclosed. The method includes: responsive to determining that an operation is being attempted on an object, determining a partition identifier associated with the object; determining a domain identifier associated with a user attempting the operation; determining whether the operation can proceed on the partition based on domain isolation rules, the domain isolation rules indicating rules for allowing or disallowing operations to proceed on the partition based on partition identifiers and domain identifiers; and responsive to determining that the operation on the partition can proceed based on the domain isolation rules, permitting the operation.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method and technique for domain based management of software or logical partitions and resource groups. For example, in some embodiments, the method and technique includes: responsive to determining that an operation is being attempted on an object, determining a partition identifier associated with the object; determining a domain identifier associated with a user attempting the operation and/or determining a domain identifier associated with the object; determining whether the operation can proceed on the partition based on domain isolation rules, the domain isolation rules indicating rules for allowing or disallowing operations to proceed on the partition based on partition identifiers and domain identifiers; and responsive to determining that the operation on the partition can proceed based on the domain isolation rules, permitting the operation. Embodiments of the present disclosure enable additional granular access control for partitions by utilizing domain based access control for the partitions by a set of rules based on an identifiers of the partition and a domain identifier of a user attempting an operation on the partition. Embodiments of the present disclosure also enable additional granular access control for objects or resources by providing hierarchical, nested and/or resource group domain control.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
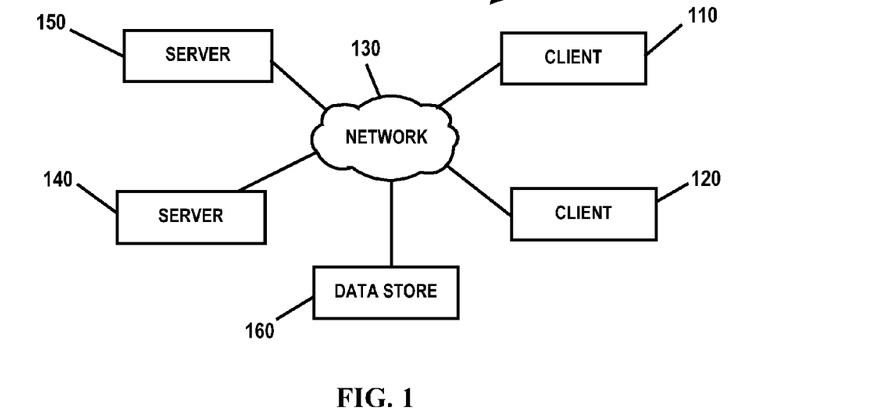
FIG. 1 is an embodiment of a network of data processing systems in which the illustrative embodiments of the present disclosure may be implemented.
Figure 2:
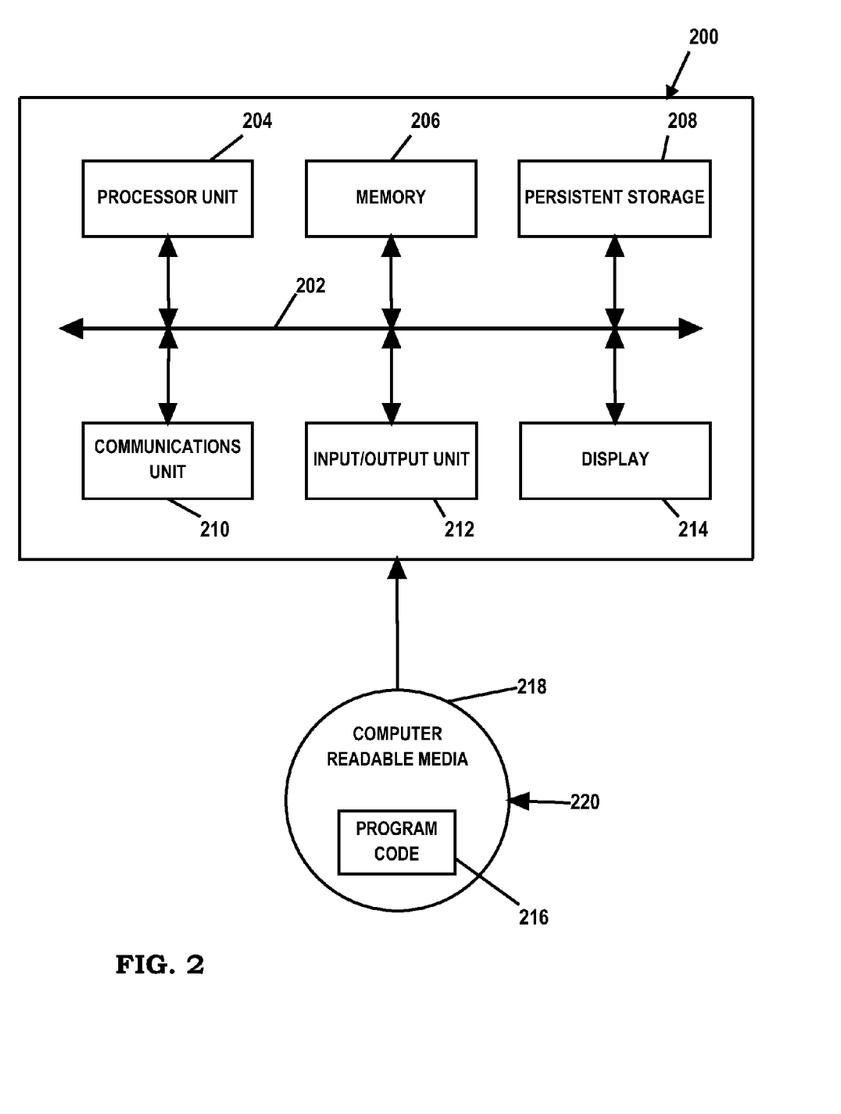
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a domain based logical partition management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
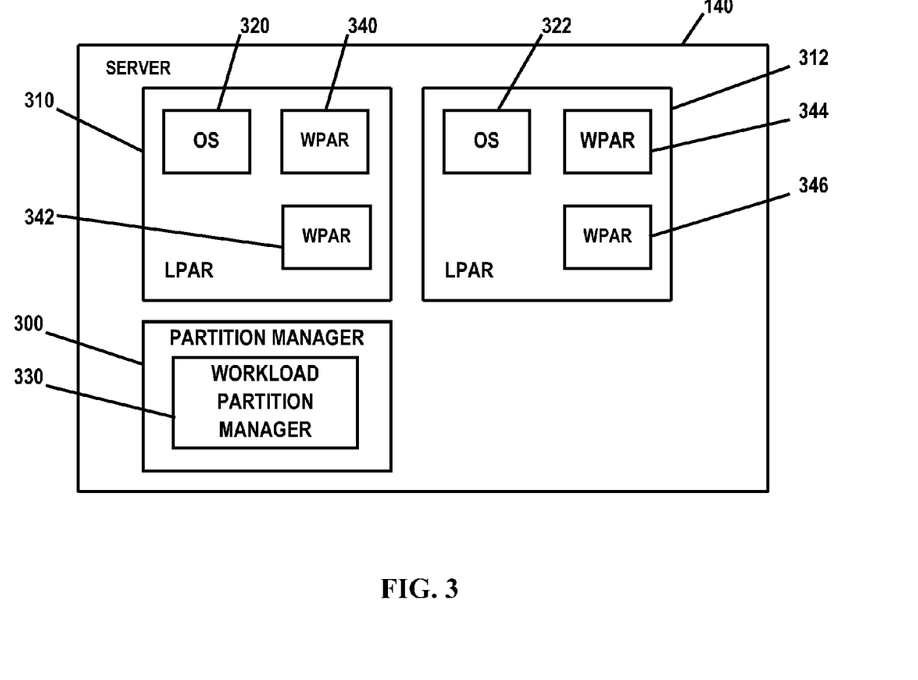
FIG. 3 is a diagram illustrating an embodiment of a data processing system for domain based logical partition and resource group management in which illustrative embodiments of the present disclosure may be implemented.

FIG. 3 is an embodiment of server 140 in which an embodiment of a domain based logical partition management system may be implemented. It should be understood that embodiments of the present disclosure may be implemented elsewhere such as, but not limited to, client 110 and/or server 150. Server 140 is configured to implement software such as processes, applications, operating systems, etc. In FIG. 3, server 140 includes a partition manager 300. Partition manager 300 may be executing in server 140 and may create one or more logical partitions ("LPARs") 310 and 312 within the server 140 environment. LPARs are assigned a subset of a computer's hardware resources (i.e., a subset of the hardware underlying the server environment) and are virtualized within the server environment as a separate computer. Resources such as processor capacity, memory, or any other type of resource may be assigned to a particular LPAR. Each LPAR has its own virtual operating system (OS) instance (e.g., operating systems 320 and 322 in respective LPARs 310 and 312) and associated files, allowing for multiple operating systems to be simultaneously executing within the server 140 environment.

In FIG. 3, partition manager 300 includes a workload partition manager 330. Workload partition manager 330 may create and manage one or more workload partitions ("WPARs") to be executing within a logical partition. WPARs are virtual operating system instances which may independently behave like an operating system image. Workload partition manager 330 may be wholly or partially a component of partition manager 300 (as depicted in FIG. 3) or may be an entirely separate module. In FIG. 3, LPAR 310 includes WPARs 340 and 342, and LPAR 312 includes WPARS 344 and 346; however, it should be understood that the quantity of WPARS created in any one of LPARs may vary.

Figure 4:
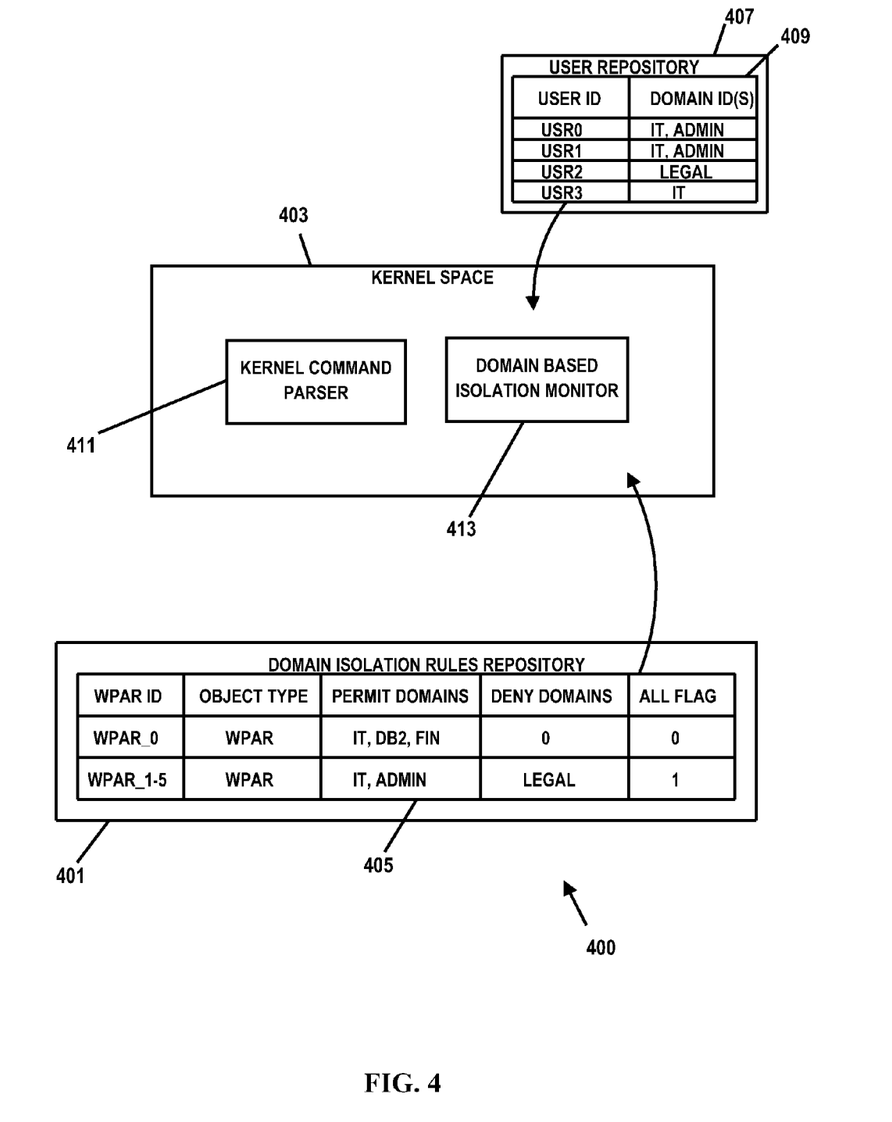
FIG. 4 is a diagram illustrating an embodiment of a data processing system for domain based partition and resource group management in which illustrative embodiments of the present disclosure may be implemented.

FIG. 4 is an illustrative embodiment of a system 400 for domain based management of virtual operating system instances or software partitions. System 400 may be implemented on data processing systems or platforms such as, but not limited to, servers 140 and/or 150, clients 110 and/or 120, or at other data processing system locations. The terms "application," "tool," "utility," and "script" are used herein to refer to one or more computer programs. The terms "process" and "instance" are used hereinto refer to an executing computer program or executing part of a computer program. To illustrate, an "operating system instance" refers to an instantiated or executing operating system computer program. A "kernel process" refers to a kernel program or kernel service executing in kernel space. "Kernel space" refers to the execution space of the kernel. The description also uses the term "subject" to refer to executing instances of kernel code, application code, a utility, or a tool.

An operating system ("OS") can support access to objects (e.g., devices, file systems, volume groups, files, etc.) for different departments of an organization and for different purposes (e.g., management of the object, writing to the object, viewing the object, invoking an object, etc.). For instance, an OS can support different applications/systems and data for a legal department, a human resources ("HR") department, and a finance department. The OS can support an electronic mail system for all three departments. The OS can also support a docketing application for the legal department and a bookkeeping application for the finance department.

The OS may also support a job application database for the HR department. An organization may want to isolate the objects for the different departments. An administrator can create domains for these different departments to isolate the objects of the departments (e.g., database records, department file systems, etc.) for confidentiality reasons, to conform to organizational task divisions (e.g., different information technology departments may support the different departments), etc. As discussed above, LPARs and WPARs may also be created and managed, and an organization may want to isolate the control and/or management of the logical/software partitions for the different departments. An administrator can associate domains with particular partitions such that the management and/or control of certain functions for the partitions are governed by a set of rules.

Functionality can be implemented in an OS to increase the granularity of isolation for software and logical partitions. A domain can be defined to represent each of different entities (e.g., different departments or work groups). User identifiers and/or user credentials can be associated with the appropriate domain or domains. For instance, an administrator can configure users as members of particular domains. An administrator can then define a set of rules that govern operation(s) that can be performed for or on the software or logical partition based on the domains. The operations can be in response to commands or instructions from an executing application, executing script, process, etc. Processes or subjects running on a system will inherit the domain or domains of a user account logged into the system. A kernel process, for example, can evaluate the set of rules that specify which domains are used to manage which logical or software partition functions. When a process or subject attempts to perform an operation associated with a software partition (e.g., change or modify a WPAR), the kernel process evaluates the domain inherited by the process, and consequently the operation, and the software partition against the set of rules to determine whether the operation is permitted to proceed. Further, objects associated with particular functions of a software partition may be internally identified as corresponding to a certain software partition. For example, configuration files needed to be executed to modify a software partition may include an identifier associating the object with a particular software partition. As an example, consider the file below including a string identifier associating the file with a software partition identified as WPAR1:

/etc/wpars/wpar1.cfg

The kernel process may evaluate the object and identify whether the object is associated with a software partition and, if so, which software partition. The domain identifiers are associated with the software partitions and internally map to a configuration file or partition identifier in the kernel software partition table for performing domain checks.

In FIG. 4, a kernel space 403 comprises a kernel command parser 411 and a domain based isolation monitor 413. Kernel command parser 411 and domain based isolation monitor 413 may be implemented in any suitable manner that may be hardware-based, software-based, or some combination of both. For example, kernel command parser 411 and domain based isolation monitor 413 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). The kernel space 403 represents memory and processes of a kernel on a machine. The kernel command parser 411 represents executing kernel code that parses commands/instructions initiated in user space of the machine hosting the kernel space 403. Although a kernel command parser 411 is not necessarily involved in receiving a command or instruction from user space, FIG. 4 depicts an example involving a command parser to avoid encumbering the description with alternatives.

The machine that hosts the kernel space 403 is communicatively coupled with a user repository 407. The user repository 407 hosts user data (e.g., user credentials, user profiles, etc.) of users that login into the machine. The user data may at least include user identifiers (e.g., usernames, serial numbers, etc.) and associated domains. Each user can be associated with 0 to n domains. When a user is assigned or associated with a domain, the system that manages the user repository 407 updates the corresponding user data to indicate the domain. For instance, a system that supports the creation of domains submits a request to the system that supports the user repository 407 to update a user profile, for example, to indicate a domain. The user repository 407 may be local to the machine that hosts the kernel space 403. The user repository 407 may be distributed throughout a cluster or hosted at a device designated for hosting the user data accessible via a network. The machine also has access to a domain isolation rules repository 401. The domain isolation rules repository 401 comprises domain isolation rules that indicate which domains are permitted for which logical partitions. A storage device that hosts the domain isolation rules repository 401 can be local or remote with respect to the machine that hosts the kernel space 403.

A root user, super user, or a user with a highest privilege can create domains and domain isolation rules. For instance, a root user can create a domain for IT administrators. The root user can also define a rule that allows access to manage/control softwafe or logical partition operations for users assigned to the IT administrator domain. Defining a domain can comprise establishing an identifier for a domain (e.g., a domain name, a unique numerical identifier, etc.) and a description of the domain. A system that hosts a repository of domains can enforce uniqueness of domain identifiers as unique names and/or generate unique numbers for domains across a node or network. Defining a domain isolation rule comprises indicating a partition and a domain(s) that facilitates performance of an operation associated with the particular partition ("permitted domain"). Defining a rule can also comprise specifying a domain that does not facilitate performance of an operation for a particular partition ("denied domain"). For instance, a user may be assigned to an IT domain and a LEGAL domain. A rule may allow a management operation on a particular partition if the operation is associated with a user who is a member of the IT domain and an HR domain. A rule may specify that the IT domain is a permitted domain, but the LEGAL domain is a denied domain. Even though the user is a member of the IT domain, an operation associated with the user is not allowed to be performed on a partition governed by the rule because the user is also a member of a denied domain. Embodiments can also indicate a flag that represents a constraint of "ANY" or "ALL" domains for a partition in a domain isolation rule. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient. Management operations can be applied on resource groups with domain isolation rules in any order of hierarchy, subset or superset form with its underlying resource group adhering to domain isolation rules.

Returning to the example depicted in FIG. 4, a set of domain isolation rules 405 are loaded into the kernel space 403 from the domain isolation rules repository 401. Although embodiments can load all of the domain isolation rules into the kernel space 403, embodiments can also limit loading to a subset of the rules. In addition, the domain isolation rules repository may index or organize rules by various criteria. For example, a set of domain isolation rules can be associated with a particular machine. As another example, domain isolation rules can be loaded after login based on domain membership or credentials of the user that logs into the machine.

User information is loaded into the kernel space 403 from the user repository 407 responsive to a user logging into the machine that hosts the kernel space 403. The user information loaded into the kernel space 403 is instantiated as a user structure instance 409. The user structure instance 409 at least indicates a user identifier and a domain associated with the user represented by the user identifier. In this example, the user repository 407 illustrates four different users identified as "USR0," "USR1," "USR2" and USR3." It should be understood that a fewer or greater number of users may be represented. USR0 and USR1 are members of the IT domain and the ADMIN domain, USR2 is a member of the LEGAL domain, and USR3 is a member of the IT domain. Kernel command parser 411 receives an instruction from user space that targets an object corresponding to a particular partition. For example, a user may enter a request to change or configure a WPAR (e.g., utilizing configuration, lock or index files). In some embodiments, the object type may be indicated as "WPAR" in the domain isolation rule which corresponds to the system files for logical or software partition management/ control that are set internally to particular WPARs. The kernel command parser 411 passes an identifier of the object targeted by the instruction to the domain based isolation monitor 413. For instance, the kernel command parser 411 can call a function that implements the domain based isolation monitor 413 with the object identifier passed as a parameter. As another example, the kernel command parser 411 can receive a message through a system call which indicates the object identifier to the domain based isolation monitor 413. The domain based isolation monitor 413 determines whether the function corresponds to a partition and, if so, the identity of the partition. For example, in some embodiments, the kernel command parser 411 may parse the command/instruction to identify any partition identifier of the command/instruction. The domain based isolation monitor 413 determines whether the instruction can be applied to the object and, correspondingly, on the partition (i.e., whether the one or more operations that implement the instruction can be performed on the object) based on the domain(s) of the user associated with the instruction. The domain based isolation monitor 413 accesses the set of domain isolation rules 405. The set of domain isolation rules 405 indicates a WPAR identifier, an object type, permitted domains, denied or conflict domains, and an ANY or ALL flag. In the illustrated embodiment, the set of domain isolation rules 405 includes a rule that indicates a partition object for a WPAR identified as WPAR_0 can be operated upon by an operation(s) associated with anyone of the domains IT, DB2, and finance ("FIN"). The set of domain isolation rules 405 also includes a rule that permits access to a file object for WPARs WPAR_1-5 (i.e., a range of WPARs including WPAR_1, WPAR_2, WPAR_3, WPAR_4 and WPAR_5) by an operation(s) associated with a user who is a member of all of the domains IT and ADMIN. Since the USR0 is a member of both the IT domain and the ADMIN domain, a command/instruction that targets a file object of WPAR_1-5 would be permitted to proceed. Even if a user is a member of both the IT and ADMIN domains but is also a member of the LEGAL domain, such operation would be denied because of the deny domain rule.

Although the depicted example refers to a file, embodiments are not so limited. Embodiments can determine whether an operation being performed by an application is permitted to operate upon or access various objects of a partition or resource group. The application would be executing as a process in a user space invoked by a user. The application process inherits the domain of the user. Thus, the corresponding domain identifier of that user would be used to evaluate the set of domain isolation rules against the operation for the object. Thus, in accordance with embodiments of the present disclosure, even if a user generally has a role in the system that would enable management and/or control of partitions or resource groups, the domain based isolation rules may limit the user's ability to utilize that role for certain partitions or resource groups.

Figure 5:
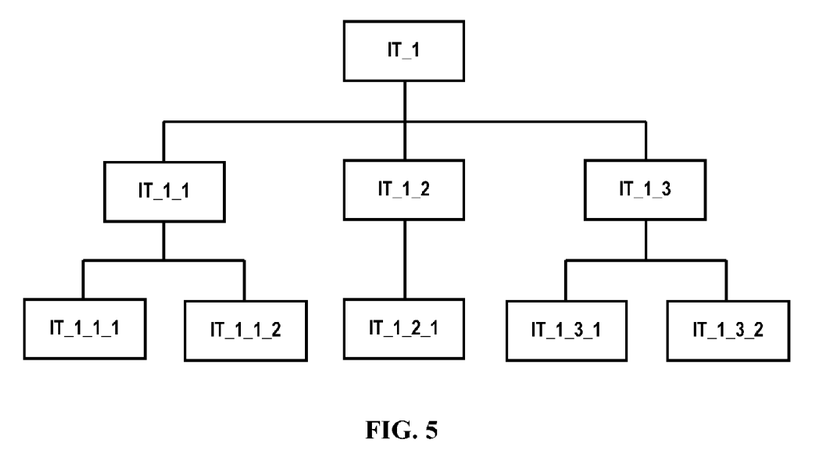
FIG. 5 is a diagram illustrating an embodiment of a hierarchical arrangement of domains according to the present disclosure.

In some embodiments, domains are assigned and managed hierarchically. For example, FIG. 5 is a diagram illustrating a hierarchy of domains. In FIG. 5, domain IT_1 is the root or parent domain, and domains IT_1_1, IT_1_2 and IT_1_3 are child domains of the parent domain IT_1. Further, domains IT_1_1_1 and IT_1_1_2 are child domains of domain IT_1-1, domain IT_1_2_1 is a child domain of domain IT_1_2, and domains IT_1_3_1 and IT_1_3_3 are child domains of domain IT_1_3. In this embodiment, a user assigned a parent domain can manage, access and/or control resources governed by the child domains of the parent domain. However, users may be assigned child domains but would not be allowed to manage, access and/or control resources governed by the parent domain. For example, user assigned the domain IT_1 could manage/control resources governed by domain IT_1 and all lower level or child domains of IT_1 (e.g., IT_1_1, IT_1_1_2, IT_1_2_1, IT_1_3_2, etc.). A user assigned the domain IT_1_1 could manage/control resources governed by domain IT_1_1 and all lower level or child domains of IT_1_1 but would not be able to control/manage resources governed by, for example, the domain IT_1_3_1. Thus, in this embodiment, resources can be managed with an additional level of granularity by assigning a hierarchical domain structure to the system resources.

Figure 6:
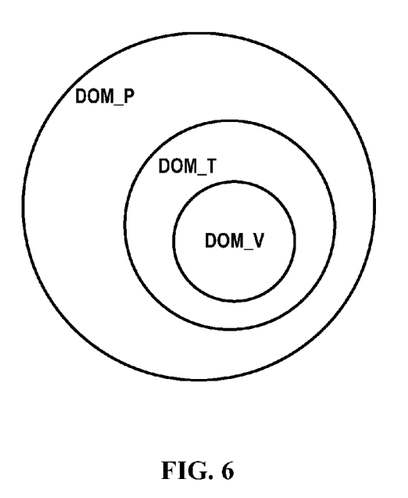
FIG. 6 is a diagram illustrating an embodiment of a nested arrangement of domains according to the present disclosure.

FIG. 6 is a diagram illustrating an embodiment of managing resources and/or objects using nested domains. For example, in the embodiment illustrated in FIG. 6, resources and/or objects may be managed using domains that are nested such that one of more domains may comprise a subset of another domain (or a subset of a superset). In FIG. 6, for example, a domain identified as DOM_V is a subset of the domain identified as DOM_T, and domain DOM_T is a subset of the domain identified as DOM_P. In this example, a user assigned a superset domain can manage, access and/or control resources governed by that superset domain as well as objects or resources governed by any domain subsets of the superset. However, users may be assigned a subset domain but would not be allowed to manage, access and/or control resources governed by the parent domain exterior to the assigned subset. Thus, in this embodiment, resources can be managed with an additional level of granularity by assigning a nested domain structure to the system resources.

Figure 7:
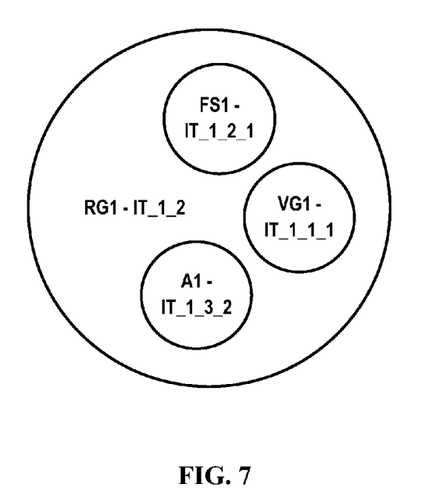
FIG. 7 is a diagram illustrating an embodiment of a resource group domain arrangement according to the present disclosure.

FIG. 7 is a diagram illustrating an embodiment of managing domained resource groups. The resources assigned to a resource group domain may include applications, volume groups, disks, filesystems, IP addresses, sockets, etc. The resource group may include an identifier (e.g., "RG1" in FIG. 7) such that the resource group may have a set of domain isolation rules applied to the resource group. For example, resource group identifiers may be included in a domain isolation rules repository (e.g., as set forth in FIG. 4 as repository 401) that indicate which domains are permitted for which resource groups. In some embodiments, a domain identifier for a resource group may have a higher precedence for access/control than compared to a domain for the resource itself (e.g., a particular disk). Referring to FIG. 7 and FIG. 5, for example, if a user has been assigned the domain identifier IT_1_2, the user can move and/or manage the resource group RG1. This user may also manage the filesystem FS1 by virtue of the parent-child hierarchy as illustrated in FIG. 5. This user cannot, however, manage the volume group VG1 because the domain IT_1_1_1 is not hierarchically linked to the domain IT_1_2.

Figure 8:
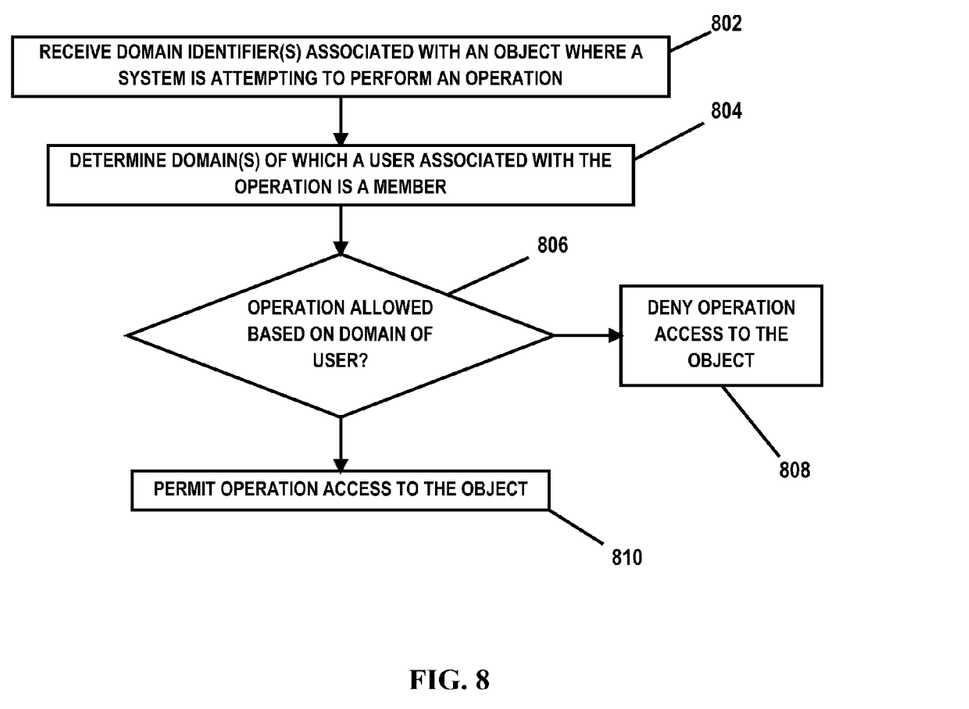
FIG. 8 is a flow diagram illustrating an embodiment of a method for domain based partition and resource group management according to the present disclosure.

FIG. 8 is a flow diagram illustrating an embodiment of a method for domain based management of partitions and resource groups. The method begins at block 802, where domain identifiers associated with an object are received that identifies an object where a system is attempting to perform an operation(s). The object that is discussed here may be a partition or a resource group. For example, the user may be attempting to create or manage a logical or software partition utilizing a configuration file or object identifier. The object identifier identifies an object that is targeted by a command, an application, an instruction, invoked function, etc. As stated earlier, the object identifier may be indicated in a function call, an instruction in an executing script, an operation originating from a utility, an application, etc. The set of one or more operations may be implementing a command or instruction that originates from a command line, application instance, operating system process, background process, etc.

At block 804, domain(s) to which the user belongs is determined. For example, the user may be a member of a human resources domain. When user data (e.g., credentials, profile, etc.) that represents a user account logged into a system is loaded, the domain identifier(s) indicated in the user data can be stored at a known or reserved location in the operating system space. When evaluating a domain isolation rule, an operating system process can access the known or reserved operating system space location for the domain identifier(s). At decisional block 806, a domain isolation rule that governs the partition is evaluated. A set of domain isolation rules can be indexed by distinct partition, resource group or object identifiers. For example, a kernel process locates a domain isolation rule using the partition, resource group or object identifier as an index. Thus, at decisional block 806, a determination is made whether the operation being attempted can be performed on the object (e.g., a partition or resource group) based on domain membership. A kernel process evaluates the located domain isolation rule for the object and determines whether the domain of the user is indicated as a permitted domain. The kernel process may also determine whether the rule indicates that a user is required to be a member of all indicated permitted domains, or if the user is a member of a denied or conflict domain. The kernel process also determines validation of order of domain identifiers with hierarchical or subset/superset form. If operation is not permitted to be performed on the object based on domain membership of the user, the method proceeds to block 808, where an indication of a denial of operation access is provided. If the operation is permitted to be performed on the object based on domain membership of the user, the method proceeds to block 810, where access to the object (e.g., partition or resource group) for the requested operation is permitted.

Thus, embodiments of the present disclosure enable additional granular access control for logical or software partitions and resource groups while reducing system administration time. Further, embodiments of the present disclosure enable additional granular access control for objects by providing hierarchical, nested and/or resource group domain control.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method, comprising:
responsive to determining that an operation is being attempted on an object, determining whether the object corresponds to a software partition;
responsive to determining that the object corresponds to a software partition, determining a partition identifier associated with the object, the partition identifier indicating one or more software partitions corresponding to the object;
determining a domain identifier associated with a user attempting the operation;

accessing domain isolation rules indicating rules for allowing or disallowing operations to proceed on the partition based on partition identifiers and domain identifiers;

determining whether the operation can proceed on the partition based on the domain isolation rules by determining whether the domain identifier associated with the user is a permitted domain for the partition identifier corresponding to the object; and responsive to determining that the operation on the partition can proceed based on the domain isolation rules by determining that the domain identifier a permitted domain for the partition identifier, permitting the operation.

2. The method of claim 1, further comprising:
associating a user identifier with the user; and
associating the user identifier with the domain identifier.

3. The method of claim 1, further comprising:
determining whether the domain isolation rules indicate a range of partition identifiers; and
responsive to determining that the domain isolation rules indicate a range of partition identifiers, determining whether a domain identifier associated with a user attempting the operation is permitted based on the range of partition identifiers.

4. The method of claim 1, further comprising:
determining whether the operation corresponds to a resource group;
responsive to determining that the operation corresponds to a resource group, determining a resource group identifier associated with the operation; and
determining whether the operation can proceed based on the domain isolation rules, the domain isolation rules indicating rules for allowing or disallowing operations to proceed based on resource group identifiers and domain identifiers.

5. The method of claim 1, further comprising:
determining whether the domain identifier associated with the user attempting the operation is hierarchically linked to a parent domain identifier;
responsive to determining that the domain identifier associated with the user attempting the operation is hierarchically linked to a parent domain identifier, determining whether the operation is permitted based on the parent domain identifier; and
responsive to determining that the operation is permitted based on the parent domain identifier, permitting the operation.

6. The method of claim 5, further comprising, responsive to determining that the operation is not permitted based on the parent domain identifier, denying the operation.

7. The method of claim 1, further comprising:
hierarchically linking two or more domain identifiers; and
determining whether the operation can proceed on the partition based on the hierarchical linking of the domain identifiers.

8. The method of claim 1, further comprising arranging at least one domain identifier within a subset of another domain identifier.

9. The method of claim 8, further comprising:
determining whether the domain identifier associated with the user attempting the operation is within a subset of a superset domain identifier;
responsive to determining that the domain identifier associated with the user attempting the operation is within the subset, determining whether the operation is permitted based on the superset domain identifier; and responsive to determining that the operation is permitted based on the superset domain identifier, permitting the operation.

10. A system, comprising:
a processor;
a domain based isolation monitor executable by the processor to:
responsive to determining that an operation is being attempted on an object, determine whether the object corresponds to a software partition;
responsive to determining that the object corresponds to a software partition, determine a partition identifier associated with the object, the partition identifier indicating one or more software partitions corresponding to the object;
determine a domain identifier associated with a user attempting the operation;
access domain isolation rules indicating rules for allowing or disallowing operations to proceed on the partition based on partition identifiers and domain identifiers;
determine whether the operation can proceed on the partition based on the domain isolation rules by determining whether the domain identifier associated with the user is a permitted domain for the partition identifier corresponding to the object; and
responsive to determining that the operation on the partition can proceed based on the domain isolation rules by determining that the domain identifier a permitted domain for the partition identifier, permit the operation.

11. The system of claim 10, wherein the isolation monitor is executable by the processor to:
determine whether the domain isolation rules indicate a range of partition identifiers; and
responsive to determining that the domain isolation rules indicate a range of partition identifiers, determine whether a domain identifier associated with a user attempting the operation is permitted based on the range of partition identifiers.

12. The system of claim 10, wherein the isolation monitor is executable by the processor to:
determine whether the operation corresponds to a resource group;
responsive to determining that the operation corresponds to a resource group, determine a resource group identifier associated with the operation; and
determine whether the operation can proceed based on the domain isolation rules, the domain isolation rules indicating rules for allowing or disallowing operations to proceed based on resource group identifiers and domain identifiers.

13. The system of claim 10, wherein two or more domain identifiers are hierarchically linked.

14. The system of claim 10, wherein the isolation monitor is executable by the processor to:
determine whether the domain identifier associated with the user attempting the operation is hierarchically linked to a parent domain identifier;
responsive to determining that the domain identifier associated with the user attempting the operation is hierarchically linked to a parent domain identifier, determine whether the operation is permitted based on the parent domain identifier; and
responsive to determining that the operation is permitted based on the parent domain identifier, permit the operation.

15. The system of claim 14, wherein the isolation monitor is executable by the processor to, responsive to determining that the operation is not permitted based on the parent domain identifier, deny the operation.

16. A computer program product for domain based partition management, the computer program product comprising:
- a computer readable storage medium having computer readable program code embodied therewith, the computer readable program code comprising computer readable program code configured to:
  - responsive to determining that an operation is being attempted on an object, determine whether the object corresponds to a software partition;
  - responsive to determining that the object corresponds to a software partition, determine a partition identifier associated with the object, the partition identifier indicating one or more software partitions corresponding to the object;
  - determine a domain identifier associated with a user attempting the operation;
  - access domain isolation rules indicating rules for allowing or disallowing operations to proceed on the partition based on partition identifiers and domain identifiers; and
  - determine whether the operation can proceed on the partition based on the domain isolation rules by determining whether the domain identifier associated with the user is a permitted domain for the partition identifier corresponding to the object; and
  - responsive to determining that the operation on the partition can proceed based on the domain isolation rules by determining that the domain identifier a permitted domain for the partition identifier, permit the operation.

17. The computer program product of claim 16, wherein the computer readable program code is configured to:
- determine whether the domain isolation rules indicate a range of partition identifiers; and
- responsive to determining that the domain isolation rules indicate a range of partition identifiers, determine whether a domain identifier associated with a user attempting the operation is permitted based on the range of partition identifiers.

18. The computer program product of claim 16, wherein the computer readable program code is configured to:
- determine whether the operation corresponds to a resource group;
- responsive to determining that the operation corresponds to a resource group, determine a resource group identifier associated with the operation; and
- determine whether the operation can proceed based on the domain isolation rules, the domain isolation rules indicating rules for allowing or disallowing operations to proceed based on resource group identifiers and domain identifiers.

19. The computer program product of claim 16, wherein the computer readable program code is configured to:
- determine whether the domain identifier associated with the user attempting the operation is hierarchically linked to a parent domain identifier;
- responsive to determining that the domain identifier associated with the user attempting the operation is hierarchically linked to a parent domain identifier, determine whether the operation is permitted based on the parent domain identifier; and
- responsive to determining that the operation is permitted based on the parent domain identifier, permit the operation.

20. The computer program product of claim 19, wherein the computer readable program code is configured to, responsive to determining that the operation is not permitted based on the parent domain identifier, deny the operation.

21. A method, comprising:
- receiving an identifier of an object on which an operation is being attempted;
- determining a domain identifier of a user attempting the operation;
- determining whether the domain identifier of the user attempting the operation is hierarchically linked to a parent domain identifier;
- responsive to determining that the domain identifier of the user attempting the operation is hierarchically linked to a parent domain identifier, determining whether the operation can proceed on the object based on the parent domain identifier and domain isolation rules;
- permitting the operation in response to determining that the operation is permitted based on the parent domain identifier;
- determining whether the operation corresponds to a resource group;
- responsive to determining that the operation corresponds to a resource group, determining a resource group identifier associated with the operation; and
- determining whether the operation can proceed based on the domain isolation rules, the domain isolation rules indicating rules for allowing or disallowing operations to proceed based on resource group identifiers and domain identifiers.

22. The method of claim 21, further comprising, responsive to determining that the operation is not permitted based on the parent domain identifier, deny the operation.

* * * * *